United States Patent [19]

Padszun et al.

[11] Patent Number: 4,665,011

[45] Date of Patent: May 12, 1987

[54] ELECTROSTATOGRAPHIC SUSPENSION DEVELOPER HAVING A BLOCK COPOLYMER CONTAINING AROMATIC VINYL COMPOUNDS AND DIENES REACTED WITH MERCAPTAN

[75] Inventors: Wolfgang Padszun; Josef Witte, both of Cologne; Carlhans Süling, Odenthal; John Goossens, Cologne, all of Fed. Rep. of Germany

[73] Assignee: Agfa Gevaert Aktiengesellschaft, Leverkusen-Bayerwerk, Fed. Rep. of Germany

[21] Appl. No.: 899,437

[22] Filed: Aug. 22, 1986

[30] Foreign Application Priority Data

Sep. 3, 1985 [DE] Fed. Rep. of Germany ....... 3531381

[51] Int. Cl.$^4$ ............................................... G03G 9/12
[52] U.S. Cl. ..................................... 430/114; 430/115
[58] Field of Search ................................ 430/115, 114

[56] References Cited

U.S. PATENT DOCUMENTS 4,599,291  7/1986  Podszun ........................ 430/115 X
4,606,989  8/1986  Uytterhoeven ................. 430/115 X

*Primary Examiner*—J. David Welsh
*Attorney, Agent, or Firm*—Connolly and Hutz

[57] ABSTRACT

New block copolymers containing
(a) a block of from 5 to 100 parts by weight polymerized, basic, nitrogen-containing aromatic vinyl compounds and from 0 to 95 parts by weight polymerized, nitrogen-free aromatic vinyl compounds and
(b) a block of polymerized $C_4$–$C_6$ dienes containing 25 to 95% lateral double bonds which are completely or partly reacted with alkylmercaptans.

are suitable for improved suspension developers.

10 Claims, No Drawings

ELECTROSTATOGRAPHIC SUSPENSION DEVELOPER HAVING A BLOCK COPOLYMER CONTAINING AROMATIC VINYL COMPOUNDS AND DIENES REACTED WITH MERCAPTAN

This invention relates to an improved electrostatographic suspension developer containing a block copolymer and to new block copolymers.

Electrostatographic images on electrostatographic recording materials are developed by dry and wet development processes. The wet development processes using suspension developers are superior to the dry development processes in regard to marginal definition and resolution.

Suspension developers generally consist of a highly insulating carrier liquid, a pigment, a charge-determining substance (also known as the controller) and a polymer. The carrier liquid preferably has a volume resistance of at least $10^9$ ohm.cm and a dielectric constant below 3.

The pigments used are, for example, standard azo dyes, xanthene dyes, phthalocyanine dyes, of the type described inter alia in DE-OS No. 29 44 021, and also triphenylmethane dyes, acridine dyes or quinoline dyes. The black pigments used are preferably carbon black pigments.

The principal function of the polymer is to impart adequate steric stabilization to the pigment dispersion and to guarantee adhesion or rather fixing of the pigment particles to the image support.

Numerous polymers of different structure may be used as a component of electrostatographic suspension developers. Thus, the use of statistic copolymers synthesized from substantially apolar monomers ($C_6$–$C_{20}$ alkyl(meth)acrylate) and more strongly polar monomers (for example aminomethacrylates, vinyl pyrrolidone) has been described in numerous publications (DE-OS No. 19 27 592, DE-OS No. 19 38 001, BE-PS No. 784 367, JP-N No. 49 129 539, JP-N No. 73 431 54). Styrene-butadiene copolymers may also be used (DE-OS No. 23 37 419, DE-OS No. 24 52 499, JP-N No. 73 290 72).

Various graft copolymers have also been used in the synthesis of suspension developers (DE-OS No. 20 42 804, DE-OS No. 21 03 045, DE-OS No. 24 21 037, DE-OS No. 25 32 281, DE-OS No. 24 32 288, DE-OS 29 35 287, GB-PS No. 2 157 343, GB-PS No. 2 029 049, US-PS No. 4 033 890). It is known from DE-OS No. 32 32 062 that the pigment particles of a suspension developer may be sterically stabilized by building up a crosslinked polymer shell by precipitation polymerization.

The use of block polymers for the steric stabilization of dispersions is described in GB-PS No. 1 186 562 and in Advances in Colloid and Interface Science, 4, 193–277 (1974). Particularly suitable block polymers are A-B-block polymers in which the polymer component A is insoluble in the dispersion medium and shows a strong affinity for the particle surface while the polymer component B is readily soluble in the dispersion medium and shows little or no affinity for the particle surface.

Although stable dispersions are obtained where block polymers of the type A-B, where A is a polystyrene block and B a polybutadiene block, are used, the particle sizes are unfavorably large.

Any ionic groups present in the polymers may play a part in the build-up of the toner charge. In general, however, the toner particles are charged by oil-soluble ionic compounds, for example by metal salts of organic acids containing long aliphatic radicals. Thus, carbon black pigments for example may be positively charged in liquid isoparaffin by organic phosphorus compounds (GB-PS No. 1 151 141). A negative charge may be built up by addition of basic metal alkylsulfonates (GB-PS No. 1 571 401).

The object of the present invention is to provide an electrostatographic suspension developer of high dispersion stability which has a small particle size and a uniform particle size distribution and which is free from agglomerates.

Another object of the invention is to provide an electrostatographic suspension developer having a positive toner charge and high charge stability. A final object of the invention is provide new block copolymers.

Now, a block polymer has been found which is characterized by:
(a) a block of from 5 to 100 parts by weight of polymerized, basic, nitrogen-containing aromatic vinyl compounds and from 0 to 95 parts by weight of polymerized, nitrogen-free aromatic vinyl compounds and
(b) a block of polymerized $C_4$–$C_6$ dienes containing 25 to 95% lateral double bonds which are completely or partly reacted with alkylmercaptans.

Suitable basic nitrogen-containing aromatic vinyl compounds are basically substituted aromatic vinyl compounds, such as for example p-dimethylaminomethylstyrene, and nitrogen-containing heteroaromatic vinyl compounds. It is preferred to use vinyl-substituted pyridines, such as for example 2-vinylpyridine, 3-vinylpyridine, 4-vinylpyridine and 2-methyl-5-vinylpyridine. 2-Vinylpyridine and 4-vinylpyridine are particularly preferred. The nitrogen-containing vinyl monomers make up from 5 to 100% by weight, preferably from 25 to 100% by weight and more preferably from 50 to 100% by weight of the sum of nitrogen-containing and nitrogen-free aromatic vinyl compounds.

Suitable nitrogen-free aromatic vinyl compounds are styrene and substituted styrenes, such as for example α-methylstyrene, 4-methylstyrene and 3-methylstyrene, and derivatives of naphthalene, such as vinyl naphthalene or isoprenylnaphthalene. Styrene is particularly preferred.

Suitable $C_4$–$C_6$ dienes are butadiene, isoprene, dimethylbutadiene, ethylbutadiene, butadiene being preferred.

In one particularly preferred embodiment, the block copolymer contains
(a) a block of from 5 to 100 parts by weight of polymerized vinylpyridine and from 0 to 95 parts by weight of polymerized styrene and
(b) a polybutadiene block of which the vinyl double bonds are completely or partly reacted with alkylmercaptans.

Block polymers of dienes and aromatic vinyl compounds, particularly block polymers of butadiene and aromatic vinyl compounds, containing from 20 to 80%, preferably from 40 to 80% and more preferably from 50 to 75% by weight of diene, are suitable for the production of the alkylmercaptan-modified block copolymers used in accordance with the invention. The polymerized diene block, particularly the polybutadiene block, contains from 25 to 95% vinyl double bonds, based on the total number of olefinic double bonds, and preferably from 40 to 80% of vinyl double bonds. The gram-molecular weights of the block polymers on which the reaction with alkyl mercaptans is based should be in the range from $10^3$ g/mole to $5.10^5$ g/mole, gram-molecular weights of from $1.10^4$ to $1.10^5$ being preferred. Block polymers of the type in question are preferably produced by anionic polymerization using alkyl lithium compounds, as described by way of example hereinafter. The proportion of vinyl double bonds may be regulated by using the usual donors, such as ethers or tertiary amines, for example tetrahydrofuran, glycoldimethylether, tetramethylethylenediamine.

In addition to polymerized dienes and polymerized aromatic vinyl compounds, the starting block copolymer may also contain other polymerized units, preferably a proportion of up to at most 20% by weight. Additional units such as these may be obtained, for example, by polymerization of the following compounds: acrylonitrile, methacrylonitrile, acrylates and methacrylates, such as for example tert.-butylmethacrylate.

The reaction with alkylmercaptans is preferably carried out in hydrocarbon solutions in the presence of radical formers. Suitable mercaptans are those which contain linear or branched alkyl groups containing from 4 to 20 carbon atoms, for example n-butylmercaptan, 2-ethylhexylmercaptan or n-dodecylmercaptan. Mercaptans containing from 8 to 20 carbon atoms in the alkyl group are preferably used.

Suitable radical formers are peroxides, for example dicyclohexylpercarbonate, tert.-butylperpivalate, dilauroyl peroxide, or azo compounds, such as azodiisobutyronitrile.

The solvents used are hydrocarbons, such as butane, hexane, heptane or isooctane, but preferably aromatic or cycloaliphatic hydrocarbons, such as toluene, cyclohexane or methylcyclopentane or mixtures thereof.

The quantity of alkylmercaptan used in this reaction is gauged so that preferably from 5 to 100% and more preferably from 10 to 75% of the vinyl double bonds of the polybutadiene block are reacted.

An electrostatographic suspension developer has also been found which contains a dispersed pigment and a block copolymer according to the invention in an electrically insulating carrier liquid having a volume resistance of at least $10^9$ ohm.cm and a dielectric constant below 3.

Suitable carrier liquids having a volume resistance of at least $10^9$ ohm.cm and a dielectric constant below 3 are hydrocarbons, fluorinated hydrocarbons or silicone oils, preferably hydrocarbon-based liquids, for example aromatic hydrocarbons, such as benzene, toluene or xylenes, or aliphatic $C_6$–$C_{15}$ hydrocarbons, such as n-hexane, cyclohexane, n-heptane, n-octane or decalin. Mixtures of different hydrocarbons may also be used. Branched aliphatic hydrocarbons, such as isodecane and isododecane, are particularly suitable.

The pigments used may be any of the above-mentioned black and colored pigments normally used for suspension developers. Suitable pigments are, for example, spirit black (C.I. No. 50415), aniline black (C.I. No. 50440), cyanine blue (C.I. No. 74250), brilliant carmine 6 B (C.I. 15850), Echtrot (C.I. No. 15865), benzidene orange (C.I. No. 21110) or permanent yellow 52 (C.I. 21100). Particularly preferred pigments are carbon black (above all basic types), Helioechtblau HG (C.I. No. 74160), Fanalrosa B (C.I. No. 45160) and Helioechtgelb GRN (C.I. No. 21100).

The pigments may generally be used without special pretreatment for the production of the suspension developer according to the invention. In special cases, for example where it is desired to obtain a particularly high toner charge, a polymer coating may be of advantage. Suitable coating materials are, for example, polymers based on styrene, $C_1$–$C_4$ alkylacrylate, $C_1$–$C_4$ alkylmethacrylate. It is of particular advantage to coat the pigments with cyanoacrylates corresponding to the following general formula:

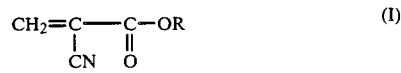

in which

R represents an alkyl group, more especially a $C_1$–$C_{10}$ alkyl group, a cycloalkyl group, more especially a cyclohexyl group, an alkenyl group, more especially an allyl group, an aryl group, more especially a phenyl group, or an aralkyl group, more especially a benzyl group.

The quantity of polycyanoacrylate used for coating is preferably from 10 to 300% by weight and more preferably from 100 to 200% by weight, based on the quantity of pigment.

The electrical charge of the toner particles may be regulated by using the above-mentioned controllers known per se. Particularly suitable, positive controllers are described in GB-PS No. 1 151 141. These controllers are divalent or trivalent metal salts of a phosphorus-based oxyacid containing an organic group, more especially salts of the metals zinc, copper, cadmium, aluminium or iron of (a) a monoester or diester of an oxyacid derived from phosphorus, (b) of an oxyacid derived from phosphorus which contains one or two organic groups attached to the phosphorus by a carbon atom or (c) of an oxyacid derived from phosphorus which contains an ester group and an organic group attached to the phosphorus by a carbon atom, this organic group being aliphatic, cycloaliphatic or aromatic.

The organic group preferably contains a chain of at least 4 carbon atoms and more especially from 10 to 18 carbon atoms and may even be substituted and/or interrupted by one or more heteroatoms, for example by oxygen, sulfur or nitrogen.

Particularly good results are obtained with the zinc salts. However, it is also possible to use other salts, for example magnesium, calcium, strontium, barium, iron, cobalt, nickel, copper, cadmium, aluminium and lead salts.

In one preferred embodiment, the suspension developer according to the invention contains a Bronsted acid containing at least one $C_6$–$C_{24}$ hydrocarbon radical, preferably in such a quantity that the basic nitrogen-containing aromatic vinyl units of the block copolymer are completely or partly present in neutralized form. The Bronsted acid added produces or strengthens a positive charge of the toner particles.

Suitable Bronsted acids are, above all, sulfuric acid monoesters and phosphoric acid monoesters and diesters, sulfonic acid, phosphonic acid and also CH-acid compounds, with the proviso that the Bronsted acid contains at least one $C_6$–$C_{24}$ hydrocarbon radical. Bronsted acids containing branched hydrocarbon radicals are preferred. Particularly suitable Bronsted acids are those corresponding to formulae II, III, IV, V and VI below:

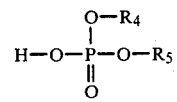 (II)

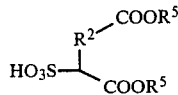 (III)

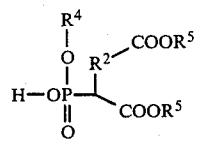 (IV)

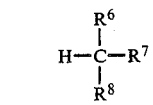 (V)

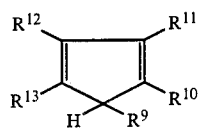 (VI)

in which
$R^2$ is a difunctional $C_1$–$C_{18}$ hydrocarbon radical,
$R^4$ is a $C_1$–$C_{18}$ hydrocarbon radical,
$R^5$ is a $C_6$–$C_{24}$ hydrocarbon radical,
$R^6$ is —COOR$^5$ or SO$_2$R$^5$,
$R^7$ and $R^8$ may be the same or different and represent one of the groups —CN, —NO$_2$, —halogen, —COOR$^5$ or —SO$_2$R$^5$,
$R^9$ to $R^{13}$ may be the same or different and represent —COOR$^{14}$ and
$R^{14}$ is a hydrocarbon radical, more especially a $C_1$–$C_{24}$ alkyl group,
with the proviso that, in at least one of the radicals $R^9$ to $R^{13}$, the substituent $R^{14}$ is a hydrocarbon radical, more especially an alkyl group, containing from 6 to 24 carbon atoms.

The following are examples of suitable Bronsted acids corresponding to the above formulae:

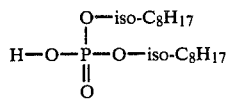

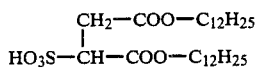

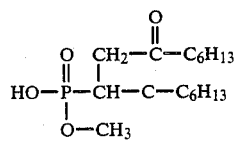

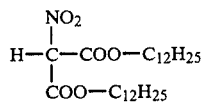

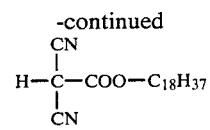

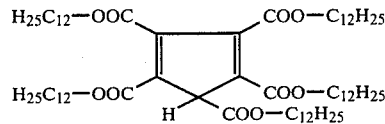

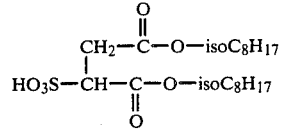

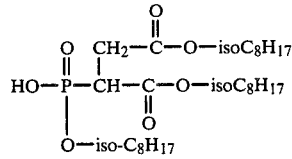

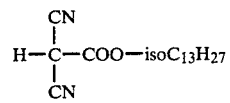

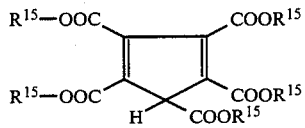

(particularly preferred)

The Bronsted acids are generally used in quantities of from 0.01 to 10% by weight and preferably in quantities of from 0.1 to 5% by weight, based on the solids content of the suspension developer according to the invention. The quantity in which the Bronsted acid is used is gauged so that the basic, nitrogen-containing aromatic vinyl units present in the block copolymer are completely or partly neutralized but preferably only partly neutralized. The level of the positive toner charge may readily be adjusted through the type and quantity of Bronsted acid used.

Although the suspension developer according to the invention is sufficiently adhesive in itself, so-called fixing agents may be incorporated in the developer for special applications of the suspension developer, for example for the development of charge images on electrophotographic binder layers. Suitable fixing agents are resins which should be compatible with the binder of the photoconductive recording material, for example with the binder of a photoconductive zinc oxide layer, so that firm adhesion of the image produced to the substrate is obtained after development. Examples of suitable resins are esters of hydrogenated rosin and long oil, rosin-modified phenol-formaldehyde resin, pentaerythritol esters of rosin, glycerol esters of hydrogenated rosin, ethyl cellulose, various alkyd resins, poly(-meth)acrylate resin, polystyrene, polyketone resin and polyvinylacetate. Specific examples of resins such as these can be found in the literature on electrostatographic suspension developers, for example in DE-PS No. 699 157 and in GB-PS No. 1 151 141.

The suspension developers according to the invention may be prepared by standard dispersion methods.

Good results are obtained using ball mills, bead mills, colloid mills and also high-speed stirrers. It is best initially to prepare a toner concentrate of carrier liquid, pigment and polymer having a solids content of from 5 to 50% by weight and preferably from 10 to 25% by weight which is diluted by addition of more carrier liquid to the in-use concentrations of from 0.05 to 2% and preferably of from 0.1 to 1%.

The block copolymer used in accordance with the invention may be applied to the pigment by a pretreatment, for example by melting on, or by precipitation from solutions. However, it is also possible to add the block copolymer to the carrier liquid from which it is adsorbed onto the pigment.

The synthesis of alkylmercaptan-modified block copolymers and also the production of suspension developers according to the invention is described in detail in the following Examples.

EXAMPLE 1

Synthesis of block copolymers A, B and C:
General procedure:

750 ml cyclohexane, 5 ml glycol dimethylether and 75 g 1,3-butadiene are introduced into a 2-liter glass autoclave in the absence of water and oxygen. The mixture is cooled to 10° C. 4 ml of a 1 molar n-butyllithium solution in n-hexane are then added. The polymerization temperature is kept at 40° C. by cooling. After 90 minutes, the reaction mixture is cooled to 20° C. The quantities of 2-vinylpyridine and styrene indicated in Table 1 are then added over a period of 5 minutes. The temperature of the reaction mixture rises to 30°–40° C. and is kept by cooling at max. 40° C. After 60 minutes, 40 g n-dodecylmercaptan and 0.5 g azodiisobutyronitrile dissolved in 15 ml toluene are added and the mixture heated to 80° C. over a period of 5 hours. The reaction mixture is concentrated in a rotary evaporator. The block copolymer remaining behind is dissolved in 200 ml cyclohexane and precipitated by addition of 2000 ml methanol. The polymer is dried in vacuo at 50° C. to constant weight. The yield comprising 90–98% of the theoretical.

TABLE 1

| Copolymer | Styrene g | 2-vinyl-pyridine g | $[\eta]^1$ | S. % | N. % |
|---|---|---|---|---|---|
| A | 30 | 10 | 0.61 | 3.7 | 0.9 |
| B | 20 | 20 | 0.46 | 3.8 | 1.8 |
| C | 0 | 30 | 0.25 | 4.3 | 3.0 |

[1]Staudinger index: dl/g in toluene at 25° C.

EXAMPLE 2

Pigment dispersions 20 parts carbon black pigment, 2 to 5 parts (10–25% by weight, based on the pigment) of the block copolymer of Example 1 and 80 parts isododecane are mixed for 15 hours in a steel ball mill. The particle sizes were measured by laser scattered-light spectroscopy. The carbon black pigment used had the following characteristic data:

| Origin | furnace black |
|---|---|
| Density | 1.8 g.cm$^{-3}$ |
| Particle size before use of the developer | 51 nm |
| Oil number (quantity linseed oil, expressed in g, adsorbed by 100 g pigment) | 250 |
| Specific surface | 31 m$^2$/g |
| Volatile material in % by weight | 2 |
| pH-value | 8 |
| Color | blue-black |

| Sample | Block copolymer % by weight, based on pigment | Particle diameter in nm | K |
|---|---|---|---|
| 1 | 10% block copolymer A | 1385 | 0.73 |
| 2 | 25% block copolymer A | 449 | 0.20 |
| 3 | 10% block copolymer B | 1040 | 0.91 |
| 4 | 25% block copolymer B | 393 | 0.12 |
| 5 | 10% block copolymer C | 913 | 0.44 |
| 6 | 25% block copolymer C | 354 | 0.14 |

K in the table is equal to the second cumulant divided by the square of the first cumulant from cumulant analysis of the autocorrelation function of the scattered laser light (Koppel, D. E., J. Chem. Phys. 57, 11 (1972) 4814–4820) and is a measure of the width of the particle size distribution. The smaller K is, the less polydisperse is the dispersion. The K-values of samples 2, 4 and 6 correspond to the values observed for substantially monodisperse latex dispersions.

It can be seen from the Table that, in the case of 25% by weight of the block copolymer used, based on the quantity of pigment, the small particle size required for a satisfactory resolving power of the developer is reached.

EXAMPLE 3

Suspension developer according to the invention 0.5 to 1% by weight zinc mono-(2-butyl)-octylphosphate (ZOP), based on the pigment, are added as charge-determining compound to samples 2, 4 and 6 of Example 2. After the dispersions have been diluted with isododecane to 1% by weight pigment, the relevant data for electrophoretic development are determined by Kohler's method (Photographic Science and Engineering 22, 4 (1978) 218–227):

| Sample No. of Example Z | ZOP (% by weight) | $X_E$ (ohm$^{-1}$m$^{-1}$) | $X_M$ (ohm$^{-1}$m$^{-1}$) | $\mu$ (m$^2$V$^{-1}$s$^{-1}$) |
|---|---|---|---|---|
| 2 | — | 0.5 × 10$^{-10}$ | — | — |
| 2 | 0.5 | 3.5 × 10$^{-9}$ | 1.5 × 10$^{-10}$ | 4.4 × 10$^{-10}$ |
| 4 | — | 0.4 × 10$^{-10}$ | — | — |
| 4 | 0.5 | 2.4 × 10$^{-9}$ | 1.1 × 10$^{-9}$ | 8.0 × 10$^{-8}$ |

$X_E$ is the conductivity of the developer as a whole, $X_M$ is the conductivity of the liquid phase of the developer after separation of the pigment particles by centrifuging. $\mu$ is the electrophoretic mobility of the pigment particles. Without addition of the charge-determining compound to the developer, the values for $\mu$ and q/m are so small that they cannot be determined. After addition of the ZOP, the particles show a clear positive charge and may be satisfactorily deposited on a negatively charged polyester film.

EXAMPLE 4

Suspension developer according to the invention 20 g Helioechtblau HG (C.I. No. 74160), 5 g block copolymer C of Example 1 and 170 g isododecane are mixed for 15 minutes in a steel ball mill. 1% pentaisotridecyl oxycarbonyl cyclopentadiene (based on solids) is added as Bronsted acid to the dispersion obtained which is then diluted to 1% and tested as toner:

| $X_e$ (ohm$^{-1}$ m$^{-1}$) | $X_M$ (ohm$^{-1}$ m$^{-1}$) | $\mu$ (m$^2$ V$^{-1}$ S$^{-1}$) | q/m* (As kg$^{-1}$) |
|---|---|---|---|
| $3.2 \cdot 10^{-9}$ | $0.19 \cdot 10^{-9}$ | $3.3 \cdot 10^{-9}$ | $7 \cdot 10^{-2}$ |

*q/m is the charge per unit weight of the toner particles

The very low conductivity of the liquid phase compared with the conductivity of the developer as a whole is of particular advantage in terms of practical application.

EXAMPLE 5

Comparison Example

Preparation of a pigment dispersion with non-alkylmercaptan-modified styrene-butadiene block polymer of the type known from GB-PS No. 1 186 562

1 g block polymer of equal parts by weight styrene and butadiene having a gram-molecular weight of $1.6 \times 10^4$ is ground for 15 hours in a ball mill with 4 g carbon black pigment and 50 ml isododecane. A coarse dispersion (particle size > 1 μm) is obtained.

1 g block polymer of 38 parts by weight styrene and 62 parts by weight butadiene having a gram-molecular weight of $1.3 \times 10^4$ is dissolved in 50 ml isododecane. This solution is ground for 15 hours with 4 g carbon black pigment. A pigment dispersion is obtained in which the dispersed particles have an average diameter of 910 nm.

The suspension developers obtained after addition of 1% by weight ZOP, based on the quantity of pigment, show a pronounced tendency towards sedimentation and at the same time give moderately toned images with inadequate resolution.

What is claimed is:

1. An electrostatographic suspension developer containing a dispersed pigment and a block copolymer in an electrically insulating carrier liquid having a volume resistance of at least $10^9$ ohm.cm and a dielectric constant below 3, characterized in that the block copolymer contains:
   (a) a block of from 5 to 100 parts by weight polymerized, basic, nitrogen-containing aromatic vinyl compounds and 0 to 95 parts by weight polymerized, nitrogen-free aromatic vinyl compounds and
   (b) a block of polymerized C$_4$–C$_6$ dienes containing 25 to 95% lateral double bonds which are completely or partly reacted with alkylmercaptans.

2. A suspension developer as claimed in claim 1, characterized in that the block copolymer contains
   (a) a block of from 5 to 100 parts by weight polymerized vinylpyridine and from 0 to 95 parts by weight polymerized styrene and
   (b) a polybutadiene block of which the vinyl double bonds are completely or partly reacted with alkylmercaptans.

3. A suspension developer as claimed in claim 1 or 2, characterized in that the suspension developer additionally contains a Bronsted acid containing at least one C$_6$–C$_{24}$ hydrocarbon radical.

4. A suspension developer as claimed in claim 3, characterized in that the Bronsted acids correspond to the following general formulae

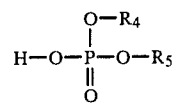

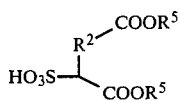

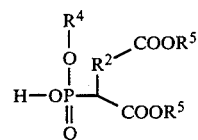

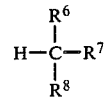

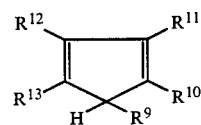

in which
R$^2$ is a difunctional C$_1$–C$_{18}$ hydrocarbon radical,
R$^4$ is a C$_1$–C$_{18}$ hydrocarbon radical,
R$^5$ is a C$_6$–C$_{24}$ hydrocarbon radical,
R$^6$ is —COOR$^5$ or SO$_2$R$^5$,
R$^7$ and R$^8$ may be the same or different and represent one of the groups —CN, —NO$_2$, —halogen, —COOR$^5$ or —SO$_2$R$^5$,
R$^9$ to R$^{13}$ may be the same or different and represent —COOR$^{14}$ and
R$^{14}$ is a C$_1$–C$_{24}$ hydrocarbon radical,
with the proviso that, in at least one of the radicals R$^9$ to R$^{13}$, the substituent R$^{14}$ is a C$_6$–C$_{24}$ hydrocarbon radical.

5. A suspension developer as claimed in claim 4, characterized in that the Bronsted acid corresponds to the following formula

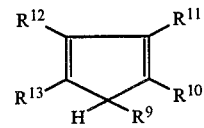

in which R$^9$ to R$^{13}$ are as defined above.

6. A suspension developer as claimed in claims 1 to 5, characterized in that the dispersed pigment is coated with polycyanoacrylate.

7. A block copolymer, characterized in that it contains:
   (a) a block of from 5 to 100 parts by weight polymerized, basic, nitrogen-containing aromatic vinyl compounds and from 0 to 95 parts by weight polymerized, nitrogen-free aromatic vinyl compounds and
   (b) a block of polymerized C$_4$–C$_6$ dienes containing 25 to 95% lateral double bonds which are completely or partly reacted with alkylmercaptans.

8. A block copolymer as claimed in claim 7, characterized in that it contains:

(a) a block of from 5 to 100 parts by weight polymerized vinylpyridine and from 0 to 95 parts by weight polymerized styrene and (b) a polybutadiene block of which the vinyl double bonds are completely or partly reacted with alkylmercaptans.

9. A suspension developer as claimed in claim 1 comprising additionally a controller compound regulating the electrical charge of the toner particles.

10. A suspension developer as claimed in claim 9 wherein the controller compound is a divalent or trivalent metal salt of a phosphorus-based oxyacid containing an organic group.

* * * * *